United States Patent [19]

Morita

[11] Patent Number: 5,035,160

[45] Date of Patent: Jul. 30, 1991

[54] AUTOMATIC TRANSMISSION CONTROL SYSTEM FOR A VEHICLE

[75] Inventor: Shigeki Morita, Himeji City, Japan

[73] Assignee: Mitsubishi Denki Kabushiki Kaisha, Tokyo, Japan

[21] Appl. No.: 487,513

[22] Filed: Mar. 2, 1990

[30] Foreign Application Priority Data

Mar. 3, 1989 [JP] Japan .................................. 1-52248

[51] Int. Cl.$^5$ ............................................ B60K 41/18
[52] U.S. Cl. .................................... 74/866; 364/424.1
[58] Field of Search ......................... 74/866; 364/424.1

[56] References Cited

U.S. PATENT DOCUMENTS

| | | | |
|---|---|---|---|
| 4,523,281 | 6/1985 | Noda et al. ......................... | 74/866 X |
| 4,742,733 | 5/1988 | Schreiner ............................... | 74/866 |
| 4,753,114 | 4/1988 | Satoh et al. ........................... | 74/866 |
| 4,848,529 | 7/1989 | Kurihara et al. .................. | 74/866 X |
| 4,889,015 | 12/1989 | Kondo .................................. | 74/866 |
| 4,930,374 | 6/1990 | Simonyi et al. ...................... | 74/866 |

FOREIGN PATENT DOCUMENTS 62-12417 3/1987 Japan .

*Primary Examiner*—Allan D. Herrmann
*Assistant Examiner*—Ryan W. Massey
*Attorney, Agent, or Firm*—Sughrue, Mion, Zinn, Macpeak and Seas

[57] ABSTRACT

An automatic tramsmission control system for a vehicle capable of automatically selecting the most suitable one of a plurality of transmission patterns in accordance with the travelling condition of the vehicle and automatically changing the transmission ratio based on the selected transmission pattern. The system comprises an engine rpm sensor, an engine load condition sensor, a vehicle speed sensor, an automatic transmission apparatus having a plurality of transmission ratios for changing the power transmitted from the engine to the driven wheels of the vehicle, and a control unit having a memory for storing a plurality of transmission patterns which correspond respectively to a plurality of ranges of the running resistance of the vehicle. The control unit receives the output signals of the sensors, calculates the running resistance of the vehicle, selects, based on the thus determined running resistance, a specific one of the transmission patterns stored in the memory which corresponds to the determined running resistance, and changes the transmission ratio of the automatic transmission apparatus making reference to the transmission pattern thus selected.

4 Claims, 3 Drawing Sheets

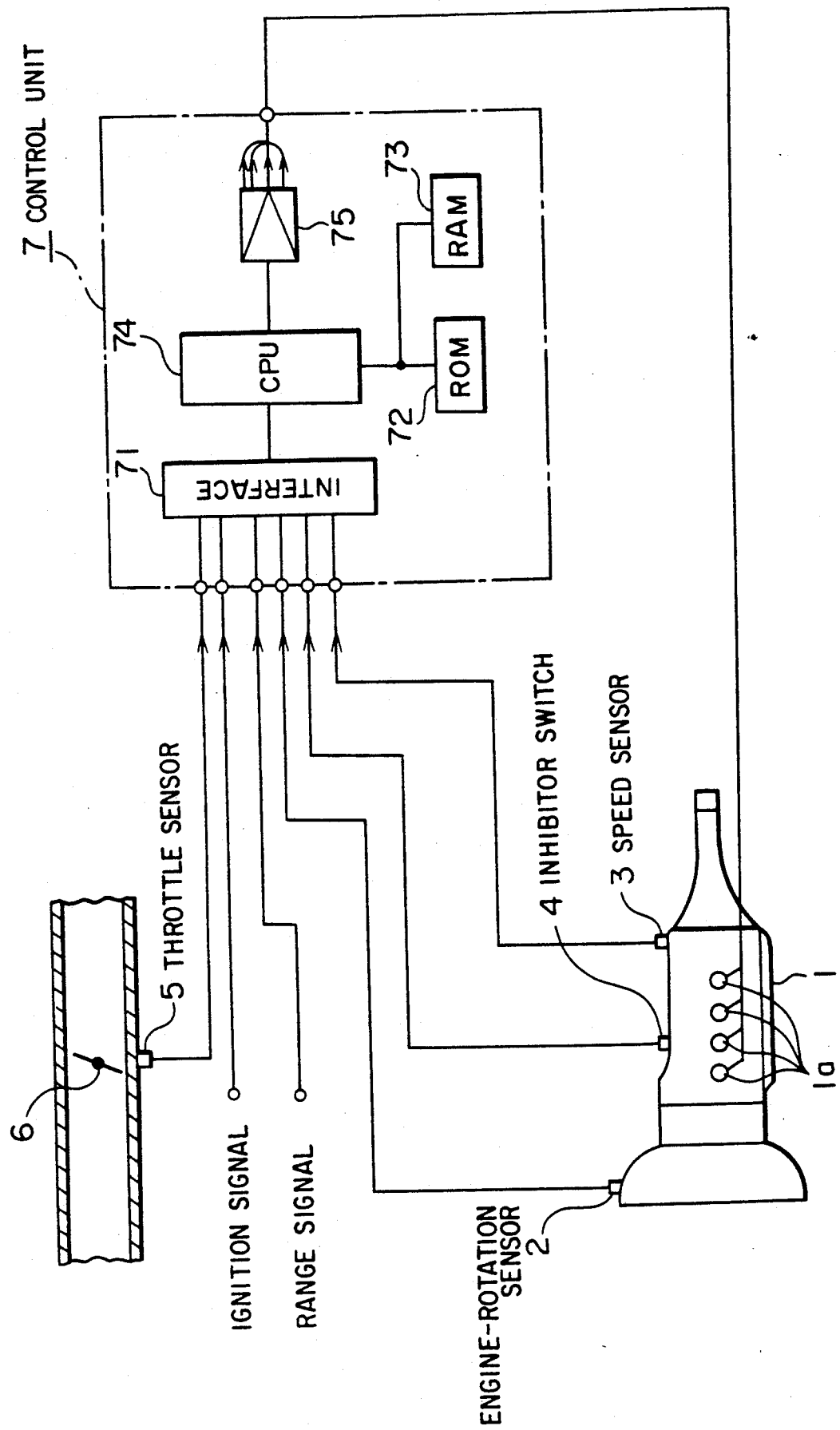

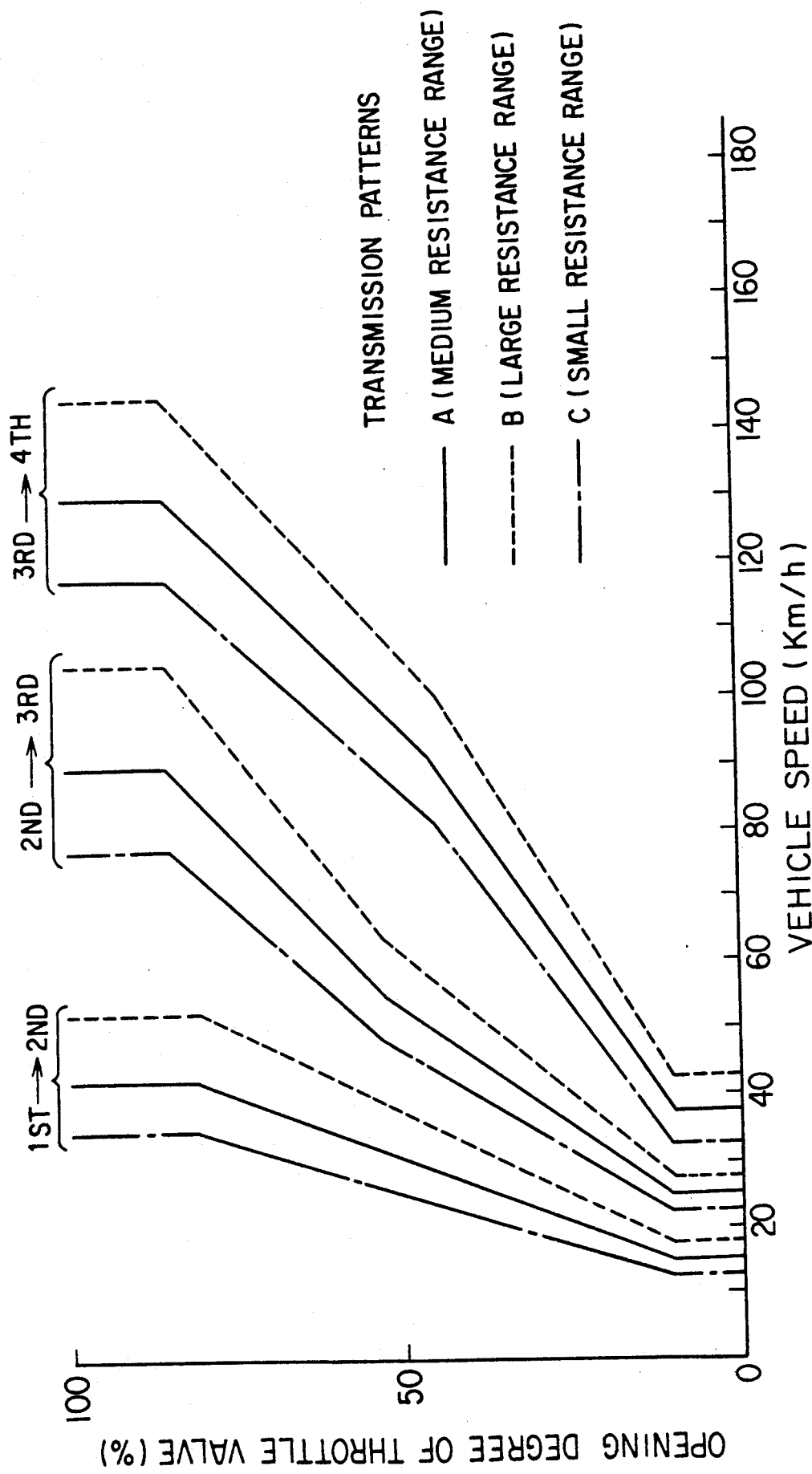

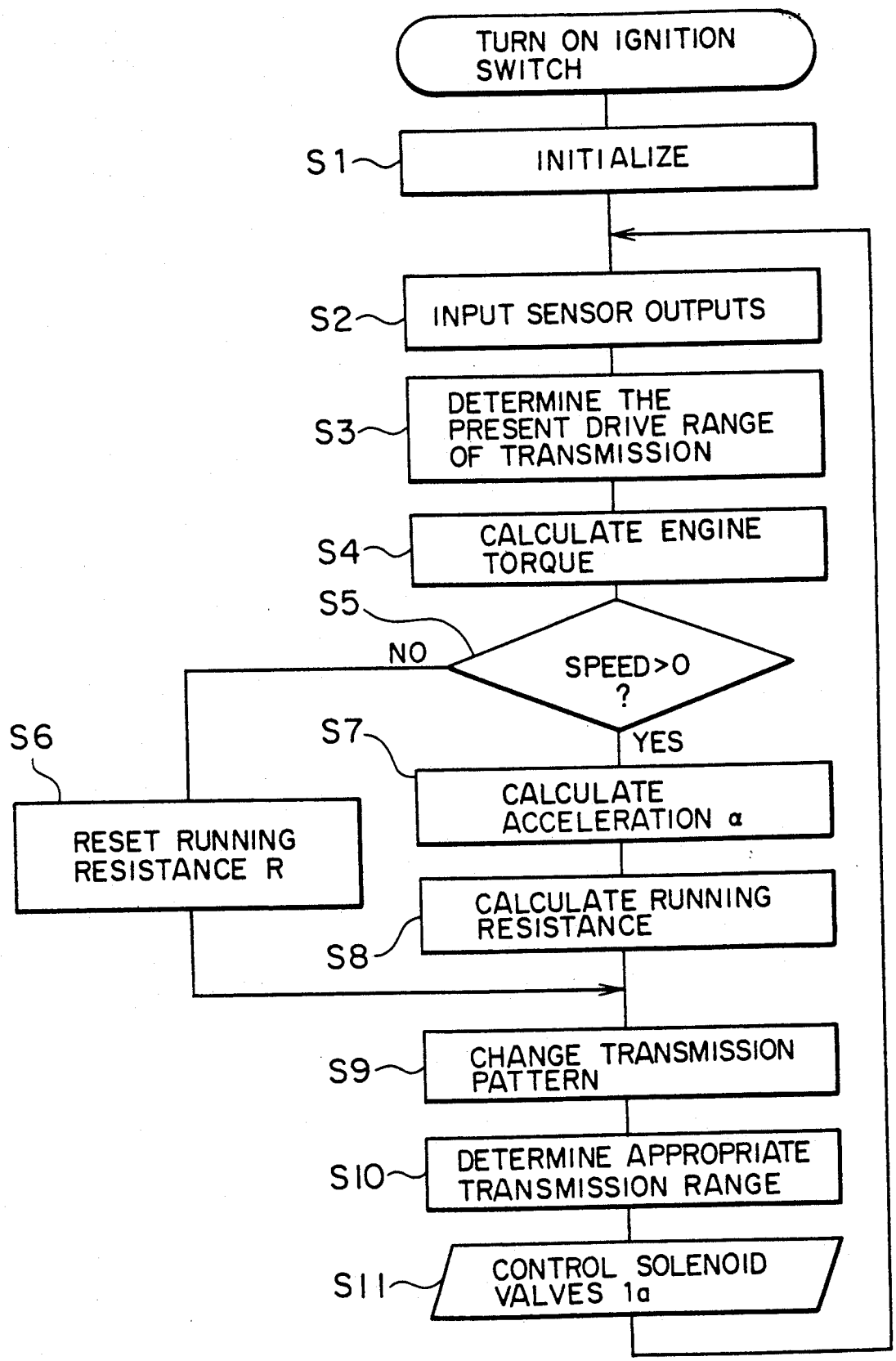

AUTOMATIC TRANSMISSION CONTROL SYSTEM FOR A VEHICLE

BACKGROUND OF THE INVENTION

The present invention relates to a control system for controlling an automatic transmission apparatus installed on a vehicle such as an automobile.

In the past, an automatic transmission control system installed on a vehicle such as an automobile is generally constructed in such a manner as to be able to change the transmission ratio or range of an automatic transmission apparatus in accordance with the running conditions of the vehicle in an automatic fashion. Such a change in the transmission ratio is effected using, as parameters, the running speed of the vehicle and an engine load such as the opening degree of a throttle valve and the like while making reference to a transmission pattern which is previously stored in a control unit.

Further, among these types of automatic transmission control systems, it is also well known that in order to meet various travelling conditions such as driving uphill, driving along a flat surface, etc., a plurality of transmission patterns corresponding respectively to the different travelling conditions are stored in the control unit, and the operator has to select the most appropriate transmission ratios judging from the travelling conditions of the vehicle under which the vehicle is travelling, so that a change in the transmission ratio or range can be made in a suitable manner.

In the above mentioned conventional automatic transmission control system, however, the travelling conditions of the vehicle can not always be detected in a precise manner, and if the operator fails to make an appropriate change or selection among the transmission patterns, there occurs a situation where the selected transmission ratio is too high for ascending a hill, resulting in an insufficient power output characteristic, or an increase in the fuel consumption, or the generation of undesirable noise. Moreover, the operator is forced to perform such a transmission-pattern selecting operation, which is not desirous from the point of view of safety in driving.

SUMMARY OF THE INVENTION

Accordingly, the present invention is intended to obviate the above-described problems of the prior art, and has for its object to provide a novel and improved automatic transmission control system for a vehicle which is able to automatically select the most suitable one of the transmission patterns in accordance with the travelling conditions of the vehicle and change the transmission ratio based on the selected transmission pattern.

In order to achieve the above object, according to the present invention, there is provided an automatic transmission control system for a vehicle comprising:

an engine-rotation sensor for sensing the number of revolutions per minute of an engine;

a load sensor for sensing the load condition of the engine;

a speed sensor for sensing the speed of the vehicle at which the vehicle is travelling;

an automatic transmission apparatus having a plurality of transmission ratios for changing the power to be transmitted from the engine to the driven wheels of the vehicle; and a control unit having memory means for storing a plurality of transmission patterns which correspond respectively to a plurality of ranges of the running resistance of the vehicle, the control unit being connected to receive the output signals of the sensors for determining, through operational calculations, the running resistance of the vehicle based on the output signals of the sensors, and selecting, based on the thus determined running resistance, a specific one of the transmission patterns stored in the memory means which corresponds to the determined running resistance, and changing the transmission ratio of the automatic transmission apparatus by making reference to the transmission pattern thus selected.

Preferably, the running resistance of the vehicle is calculated using the following formula:

$$R = T \cdot G \cdot (1/r) - \alpha \cdot m$$

where T is the engine torque; G is the present transmission ratio; r is the radius of the driven wheels; $\alpha$ is the acceleration of the vehicle; and m is the weight of the vehicle.

In an embodiment, the plurality of transmission patterns include at least three sets of transmission patterns corresponding to a low running resistance range, a medium running resistance range and a high running resistance range, respectively.

The above and other objects, features and advantages of the present invention will become apparent from the following detailed description of a presently preferred embodiment thereof as illustrated in the accompanying drawings.

BRIEF DESCRIPTION OF THE DRAWINGS

FIG. 1 is a schematic view showing the general construction of an automatic transmission control system for a vehicle in accordance with the present invention;

FIG. 2 is a diagrammatic view showing a plurality of sets of transmission patterns stored in a control unit; and FIG. 3 a flow chart showing the sequential steps of a control program executed by the control unit.

DETAILED DESCRIPTION OF A PREFERRED EMBODIMENT

The present invention will now be described in detail with reference to a preferred embodiment thereof as illustrated in the accompanying drawings.

Referring to the drawings and first to FIG. 1, there is illustrated the general construction of an automatic transmission control system for a vehicle according to the present invention. The automatic transmission control system includes an automatic transmission apparatus 1 comprising a torque converter, a speed-change gear and a hydraulic circuit for driving and controlling these members, the hydraulic circuit having a plurality of valves 1a each in the form of a solenoid valve, by the selective operation of which a desired transmission ratio or range is obtainable. The automatic transmission control system further includes an engine-rotation sensor 2 for sensing the number of revolutions per minute of the engine based on the rotation of an input shaft of the transmission apparatus 1 which is drivably connected with the engine, a speed sensor 3 for sensing the speed of the vehicle from the rotation of an output shaft of the transmission apparatus 1 which is drivingly connected with the driven wheels of the vehicle, an inhibitor switch 4 for sensing the operating condition of the transmission apparatus 1, i.e., for sensing whether or not the transmission apparatus 1 is in the neutral or the park position, a load sensor 5 in the form of a throttle sensor for sensing the load condition of the engine, the load sensor 5 generating an output signal representative of the opening degree of a throttle valve 6 disposed in an intake pipe, and a control unit 7 constituting the most important part of the present invention and connected to receive the output signals of various sensors including the elements 2 through 5 for performing certain operational calculations based thereupon and generating output signals for driving and controlling the solenoid valves 1a of the transmission apparatus 1. The control unit 7 includes an interface 71 for receiving the output signals from the engine-rotation sensor 2, the speed sensor 3, the inhibitor switch 4, and the load sensor 5, as well as an ignition signal from an unillustrated ignition system, a range signal indicative of the position (i.e., a specific speed-change range) of the speed-change gear of the transmission apparatus 1 and the like, a ROM 72 for storing a plurality of transmission (i.e., speed-change) patterns which have, as parameters, the opening degree of the throttle valve 6 and the speed of the vehicle, as well as for storing a program for performing certain operational calculations, a RAM 73 for temporarily storing data, a central processing unit (CPU) 74 for performing the operational calculations based upon the outputs of the interface 71, the ROM 72 and the RAM 73, and an output circuit 75 for supplying the output signals of the CPU 74 to the solenoid valves 1a so as to control the hydraulic circuit of the transmission apparatus 1. Here, it is to be noted that the transmission patterns stored in the ROM 72 include a plurality of sets of transmission shift patterns which are classified, for example, according to the load condition of the vehicle. Thus, as shown, for example, in FIG. 2, the transmission patterns include three sets of transmission patterns, i.e., a standard or medium-load pattern A which is designated by the solid lines and suitable for the vehicle's cruising on a flat road, a heavy-load pattern B which is designated by the broken lines and suitable for the vehicle's travelling under a heavy load such as a large running resistance (e.g., travelling uphill), and a light-load pattern C which is designated by the phantom lines and suitable for the vehicle's travelling under a light load such as a small running resistance (e.g., travelling downhill).

The operation of the above mentioned embodiment will now be described in detail with particular reference to FIG 3.

In FIG. 3, first in Step S1, when an unillustrated ignition switch is first turned on by the operator, an ignition signal is fed from an unillustrated ignition circuit to the interface 71 of the control unit 7 which is thereby initialized, clearing the data previously stored in the RAM 73 and resetting the running resistance of the vehicle to be stored therein at a predetermined value suitable for normal travelling of the vehicle on a flat road. In Step S2, the output signals from the various sensors such as the engine-rotation sensor 2, the speed sensor 3, the inhibitor switch 4, the throttle sensor 5 and the like are fed to the control unit 7 through the interface 71 and read into the CPU 74 as digitalized signals. Then, in Step S3, it is determined based on the range signal from the transmission apparatus 1 which range the drive range of the transmission apparatus 1 is in. In other words, it is determined from the drive range of the transmission apparatus 1 what the present transmission ratio of the transmission apparatus 1 is. In Step S4, an engine torque T which is generated by the engine is calculated based on the number of revolutions per minute of the engine as sensed by the engine-rotation sensor 2 and the engine load such as the opening degree of the throttle valve 6 as sensed by the throttle sensor 5. In Step S5, it is determined whether the speed of the vehicle is zero, and if the answer is "NO", the program goes to Step S6 where the running resistance of the vehicle is reset to be at the standard value suitable for cruising on a flat road. On the other hand, if the answer is "YES" in Step S5, the program goes to Step S7 where the acceleration α of the vehicle is calculated based on the vehicle speed as sensed by the speed sensor 3, and then in Step S8, the running resistance R of the vehicle is calculated using the following formula:

$$R = T \cdot G \cdot (1/r) - \alpha \cdot m$$

where G is the present transmission ratio; r is the radius of the driven wheels; and m is the weight of the vehicle. The radius of the driven wheels r and the weight of the vehicle m are prestored in the ROM 72 and read out therefrom as necessary. The vehicle weight m is generally set to be as the net weight of the vehicle plus a prescribed standard weight of the passengers (e.g., the total weight of two average adult persons). Subsequently, in Step S9, an appropriate one of the plurality of transmission shift patterns A, B and C, and which are shown, for example, in FIG. 2 and stored in the ROM 72, is selected based on the running resistance R which is determined in Step S6 or Step S8 and stored in the RAM 73. Specifically, if the running resistance R is less than a prescribed first level, the low-load pattern C is taken; if the running resistance R is equal to or greater than the first level and at the same time less than a prescribed second level, the medium-load pattern A is taken; and if the running resistance is equal to or greater than the second level, the large-load pattern B is taken.

Thereafter, in Step S10, based on the opening degree of the throttle valve 6 and the speed of the vehicle, an appropriate transmission ratio is determined based on the transmission pattern selected in the above manner and stored in the RAM 73. In Step S11, based on the appropriate transmission ratio thus determined, the CPU 74 generates and feeds output signals to the solenoid valves 1a through the output circuit 75 so that the solenoid valves 1a are driven to open and close in an appropriate manner so as to change the gear ratio of the speed-change gear of the transmission apparatus 1 to the above determined appropriate transmission ratio. Thus, repeating the routine including Steps S2 through S11 every predetermined period of time such as, for example, 25 ms, the transmission apparatus 1 can perform transmission operations in a smooth manner. Also, by treating the running resistance R with a filter having a predetermined time duration such as about 0.2-1 seconds, it is possible to avoid the undesirable situation of frequent changes in the transmission pattern.

Although in the above embodiment, the set of transmission patterns stored in the ROM 72 is such that the transmission ratio is sequentially shifted from the 1st-speed range into the 2nd-speed range, from the 2nd-speed range into the 3rd-speed range, and from the 3rd-speed range into the 4th-speed range, as illustrated in FIG. 2, it is possible to store, in addition to such a set of transmission patterns, one or more sets of different transmission patterns in the ROM 72 and select an appropriate set of these patterns in response to the travelling conditions of the vehicle. One example of such different transmission patterns is that the transmission ratio is sequentially shifted from the 4th-speed range into the 3rd-speed range, from the 3rd-speed range into the 2nd-speed range, the 2nd-speed range into the 1st-speed range. Further, though the running resistance R of the vehicle is classified into three distinct ranges including the large, medium and small resistance ranges, it may instead be classified into four or more ranges.

As described in the foregoing, according to the present invention, the running resistance of the vehicle is calculated based on the travelling conditions of the vehicle, and the transmission pattern is switched into the most suitable one in accordance with the running resistance thus calculated so that the most suitable transmission pattern can be selected in an automatic and reliable manner. Accordingly, based on the most suitable transmission pattern thus selected, it is possible to automatically determine a transmission ratio or range which is most suited to the present travelling conditions of the vehicle.

What is claimed is:

1. An automatic transmission control system for a vehicle comprising:
    an engine-rotation sensor (2) for sensing the number of revolutions per minute of an engine;
    a load sensor (5) for sensing the load condition of the engine;
    a speed sensor (3) for sensing the speed of the vehicle at which the vehicle is travelling;
    an automatic transmission apparatus (1) having a plurality of transmission gear ratios for changing the power to be transmitted from the engine to the driven wheels of the vehicle; and
    a control unit (7) having memory means for storing a plurality of transmission shift patterns individually corresponding to a plurality of ranges of the running resistance of the vehicle, said control unit being connected to receive the output signals of said sensors for determining, through operational calculations, the running resistance of the vehicle based on the output signals of said sensors, and automatically selecting, based on the thus determined running resistance, a specific one of said plurality of transmission shift patterns stored in said memory means which corresponds to the determined running resistance, and changing the transmission gear ratio of said automatic transmission apparatus based on the selected transmission pattern.

2. The automatic transmission control system for a vehicle according to claim 1, wherein the running resistance of the vehicle is calculated using the following formula:

$$R = T \cdot G \cdot (1/r) - a \cdot m$$

where T is the engine torque; G is the present transmission ratio; r is the radius of the driven wheels; $\alpha$ is the acceleration of the vehicle; and m is the weight of the vehicle.

3. The automatic transmission control system for a vehicle according to claim 2, wherein said plurality of transmission patterns include at least three sets of transmission patterns corresponding to a low running resistance range, a medium running resistance range and a high running resistance range, respectively.

4. The automatic transmission control system for a vehicle according to claim 1, wherein said transmission patterns have, as parameters, the load condition of the engine and the speed of the vehicle.

* * * * *